United States Patent
Wu et al.

(10) Patent No.: US 12,266,277 B2
(45) Date of Patent: Apr. 1, 2025

(54) DISPLAY DEVICE

(71) Applicant: InnoLux Corporation, Miao-Li County (TW)

(72) Inventors: Yuan-Lin Wu, Miao-Li County (TW); Kuan-Feng Lee, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 18/544,398

(22) Filed: Dec. 18, 2023

(65) Prior Publication Data

US 2024/0127720 A1 Apr. 18, 2024

Related U.S. Application Data

(63) Continuation of application No. 18/092,445, filed on Jan. 3, 2023, which is a continuation of application No. 17/369,975, filed on Jul. 8, 2021, now Pat. No. 11,557,231.

(30) Foreign Application Priority Data

Aug. 3, 2020 (CN) .......................... 202010767082.8

(51) Int. Cl.
*G09F 9/30* (2006.01)
*G06F 1/16* (2006.01)
*G06F 1/20* (2006.01)

(52) U.S. Cl.
CPC ............ *G09F 9/301* (2013.01); *G06F 1/1652* (2013.01); *G06F 1/206* (2013.01)

(58) Field of Classification Search
CPC combination set(s) only.
See application file for complete search history.

(56) References Cited

U.S. PATENT DOCUMENTS

| | | | |
|---|---|---|---|
| 10,534,400 B2 * | 1/2020 | Wu | G06F 1/1652 |
| 10,564,676 B2 * | 2/2020 | Kwon | H04N 5/64 |
| 10,963,014 B1 * | 3/2021 | Park | H04B 1/3827 |
| 11,234,337 B2 * | 1/2022 | Song | G06F 1/1652 |
| 11,300,996 B2 * | 4/2022 | Kim | G06F 1/1656 |
| 11,334,118 B2 * | 5/2022 | Song | G06F 1/1652 |
| 11,528,819 B2 * | 12/2022 | Lee | H04M 1/0268 |
| 11,538,367 B2 * | 12/2022 | Huang | H01L 27/156 |
| 11,557,231 B2 * | 1/2023 | Wu | G06F 1/206 |
| 11,887,511 B2 * | 1/2024 | Wu | G06F 1/206 |
| 12,045,089 B2 * | 7/2024 | Moon | G06F 1/1681 |
| 2019/0138058 A1 * | 5/2019 | Kwon | G09G 3/22 |
| 2019/0361494 A1 * | 11/2019 | Wu | H04M 1/0268 |
| 2020/0170114 A1 * | 5/2020 | Choi | H05K 5/0017 |
| 2020/0225708 A1 * | 7/2020 | Wu | G06F 3/044 |
| 2021/0051809 A1 * | 2/2021 | Song | G06F 1/1652 |

(Continued)

FOREIGN PATENT DOCUMENTS

| | | |
|---|---|---|
| CN | 1747105 A | 3/2006 |
| CN | 101271209 A | 9/2008 |
| CN | 110942717 A | 3/2020 |

*Primary Examiner* — Lisa Lea-Edmonds
(74) *Attorney, Agent, or Firm* — Winston Hsu

(57) ABSTRACT

A display device includes a flexible display panel having two surfaces opposite to each other, and a heat dissipation sheet disposed on one of the two surfaces of the flexible display panel and being foldable together with the flexible display panel. In a side view, the heat dissipation sheet includes at least one opening.

8 Claims, 12 Drawing Sheets

(56) References Cited

U.S. PATENT DOCUMENTS

| | | | |
|---|---|---|---|
| 2022/0019261 A1* | 1/2022 | Kang | G06F 1/1686 |
| 2022/0029124 A1* | 1/2022 | Kang | H10K 59/8791 |
| 2022/0036772 A1* | 2/2022 | Wu | G06F 1/20 |
| 2022/0037625 A1* | 2/2022 | Song | H10K 59/873 |
| 2023/0147918 A1* | 5/2023 | Wu | G06F 1/206 |
| | | | 361/679.01 |
| 2023/0255053 A1* | 8/2023 | Chen | H10K 59/8794 |
| | | | 361/708 |
| 2024/0127720 A1* | 4/2024 | Wu | G06F 1/1652 |

* cited by examiner

DISPLAY DEVICE

CROSS REFERENCE TO RELATED APPLICATIONS

This application is a continuation application of U.S. application Ser. No. 18/092,445, filed on Jan. 3, 2023, which is a continuation application of U.S. application Ser. No. 17/369,975, filed on Jul. 8, 2021. The contents of these applications are incorporated herein by reference.

BACKGROUND OF THE DISCLOSURE

1. Field of the Disclosure

The present disclosure generally relates to an electronic device, in particular to a display device.

2. Description of the Prior Art

In recent years, an electronic device or a deformable electronic device has become one of the focuses of the new generation of the electronic technology. Therefore, the demands for a flexible display device which may be incorporated into an electronic device have also been increasing accordingly, such as a rollable display device.

When the battery system board in the rollable display device is working, it generates heat and becomes a heat source. If the heat generated by the battery system board is not quickly dissipated due to the structural design, the resultantly formed hot spot may affect heat-sensitive components and increase the probability of display abnormalities, thereby reducing the reliability of the display device. Because consumers have higher and higher requirements for flexible display devices, it is one of the important issues for manufacturers to develop display devices of higher reliability.

SUMMARY OF THE DISCLOSURE

In view of this, the present disclosure proposes a display device with a novel thermal conductive structure. The novel thermal conductive structure may improve the thermal conductivity of the display device, or may increase the reliability of the display device.

According to some embodiments of the present disclosure, there is provided a display device including a flexible display panel and a heat dissipation sheet. The flexible display panel has two surfaces opposite to each other. The heat dissipation sheet is disposed on one of the two surfaces of the flexible display panel and foldable together with the flexible display panel. In a side view, the heat dissipation sheet includes at least one opening.

According to the display device of the embodiments of the present disclosure, by adjusting the shapes, structures and/or thermal conductivity of the heat dissipation sheet, the heat generated by the heat source in the display device may be uniformly dispersed, thereby reducing the temperature of the hot spot. In such a way, the heat dissipation quality of the display device may be improved, or the reliability of the display device may be enhanced.

These and other objectives of the present disclosure will no doubt become obvious to those of ordinary skill in the art after reading the following detailed description of the embodiment that is illustrated in the various figures and drawings.

DETAILED DESCRIPTION

The present disclosure may be understood by reference to the following detailed description, taken in conjunction with the drawings as described below. It is noted that, for purposes of illustrative clarity and being easily understood by the readers, various drawings of this disclosure show a portion of the touch display device, and certain elements in various drawings may not be drawn to scale. In addition, the number and dimension of each device shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function.

In the following description and in the claims, the terms "include", "comprise" and "have" are used in an open-ended fashion, and thus should be interpreted to mean "include, but not limited to".

When a component or a film layer is referred to as "disposed on another component or another film layer" or "electrically connected to another component or another film layer", it may mean that the component or film layer is directly disposed on another component or film layer, or directly connected to another component or film layer, or there may be other components or film layers in between. In contrast, when a component is said to be "directly disposed on another component or film" or "directly connected to another component or film", there is no component or film which inserts between the two.

Although terms such as first, second, third, etc., may be used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element may be a second constituent element in a claim.

The technical features in different embodiments described in the following may be replaced, recombined, or mixed with one another to constitute another embodiment without departing from the spirit of the present disclosure.

Figure 1:
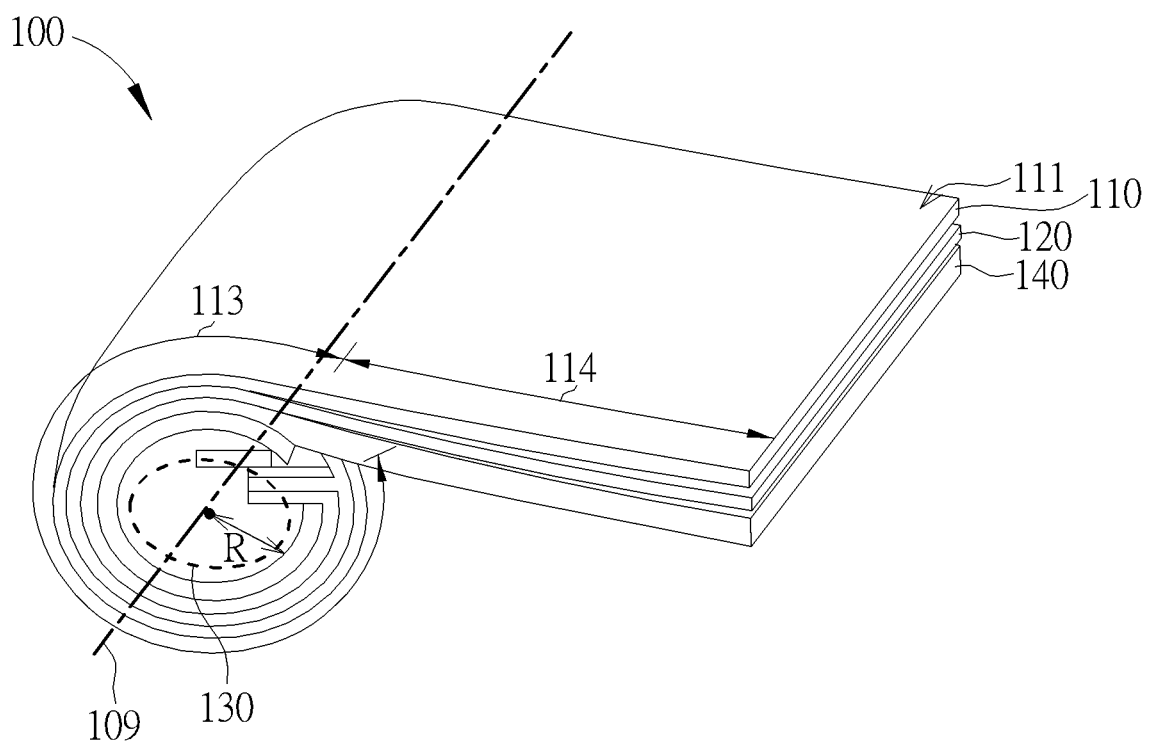
FIG. 1 is a schematic diagram of the display device according to the first embodiment of the present disclosure in an unrolled state or a partially rolled state.

FIG. 1 is a schematic diagram of the display device 100 according to the first embodiment of the present disclosure in an unrolled state or a partially rolled state. Please refer to FIG. 1, the display device 100, a rollable display panel 110, an optional supporting plate 120 disposed under the rollable display panel 110, and a heat dissipation sheet 140. In some embodiments, the display device 100 may also optionally include an electronic system 130 physically and/or electrically connected to the rollable display panel 110, for example, to provide the rollable display panel 110 with power, or with display information, or with signals, but the present disclosure is not limited thereto. The rollable display panel 110 has two surfaces which are opposite to each other, such as a first surface 111 and a second surface 112 (please see FIG. 3). As shown in FIG. 1 and in FIG. 3, the first surface 111 may be the display side of the rollable display panel 110, and the second surface 112 may be the back side of the rollable display panel 110. The heat dissipation sheet 140 may be disposed on one of the two surfaces of the rollable display panel 110, for example, on a side of the second surface 112, and may be rolled together with the rollable display panel 110.

The rollable display panel 110 may include a flexible substrate 117 (please see FIG. 3) and a display layer 118 (please see FIG. 3) disposed on the flexible substrate. The flexible substrate may be a transparent or an opaque organic polymeric material, for example, may include polyimide (PI), polycarbonate (PC), polyethylene terephthalate (PET), or a combination of the above, but the present disclosure is not limited thereto. The flexible substrate may also include, for example, thin glass, or any suitable material. The display layer may include any type of display medium, of electronic elements and/or of light-emitting elements. For example, the display medium may include a liquid crystal, fluorescence, phosphor, a light-emitting diode, other suitable display media, or a combination of the above, but the present disclosure is not limited thereto. Electronic components may include (but are not limited to) transistors, capacitors, and/or wires. The light-emitting element may be an organic light-emitting diode (OLED), a micro light-emitting diode (micro-LED), a sub-millimeter light-emitting diode (mini-LED), a quantum dot light-emitting diode (quantum dot LED, QDLED), a nano wire light-emitting diode (nano wire LED) or a bar type LED, but the present disclosure is not limited thereto. The types of the light-emitting diodes are not limited. For example, it may be a flip chip type light-emitting diode or a vertical type light-emitting diode, but the present disclosure is not limited thereto. The rollable display panel 110 may generate heat when the display device 100 is in use.

The display device 100 of the present disclosure may be a flexible electronic device, and may be rolled with respect to a rolling axis (not shown) as the axis 109. The display device 100 of the present disclosure may also have a rolling radius R in the rolled state, as shown in FIG. 1. The term "flexible" here refers to an electronic device which may be curved, bent, fold, rolled, flexible, stretch and/or other similar deformations, hereinafter "rollable" is used to represent the above-mentioned deformations. The display device 100 may further include an antenna device, a sensing device or a tiling device, but the present disclosure is not limited thereto. The antenna device may be, for example, a liquid crystal antenna. The tiling device may be, for example, a display tiling device or an antenna tiling device. It should be noted that the electronic device may be any combination of the above, but the present disclosure is not limited thereto.

The optional supporting plate 120 may be disposed on the second surface 112 of the rollable display panel 110, and may be used to support the rollable display panel 110 when necessary. The supporting plate 120 may be a plate which has a thickness, such as an organic supporting plate material or an inorganic supporting plate material. The organic supporting plate material may include polyimide, and the inorganic supporting plate material may include a metal or an alloy, such as a stainless steel plate, but the present disclosure is not limited thereto.

The electronic system 130 may include one or more electronic components or computing units, for example may include a battery, a system board, a printed circuit board (PCB), a COF (chip on film), and a flexible printed circuit assembly, FPCA) or a combination of the above, but the present disclosure is not limited thereto. In the embodiment in FIG. 1, the electronic system 130 includes the flexible board module 1301 as an example, but the present disclosure is not limited thereto. The electronic system 130 may be the signal input terminal of the display device 100 to the rollable display panel 110, and may generate heat when the display device 100 is in use and becomes a heat source.

According to some embodiments, the heat dissipation sheet 140 may have different designs according to different portions of the rollable display panel 110. For example, as shown in FIG. 1, the rollable display panel 110 may include a first region 113 and a second region 114. The rollable display panel 110 in the first region 113 and in the second region 114 may have different properties. The first region 113 and the second region 114 may be different portions, and the second region 114 may be a part outside of the first region 113. According to some embodiments, as shown in FIG. 1, the first region 113 may be closer to the electronic system 130, and the second region 114 may be farther away from the electronic system 130. According to some embodiments, compared to the second region 114, the first region 113 may be a portion with a higher temperature in the display device 100, and have higher requirements for the heat dissipation. According to some embodiments, the first region 113 may be closer to the axis 109, and the second region 114 may be farther away from the axis 109.

FIG. 1 illustrates that at least a portion of the display device 100 is unrolled. As shown in FIG. 1, a region of the rollable display panel 110 surrounds the electronic system 130 by rolling. In this case, the first region 113 of the rollable display panel 110 may be a portion of the rollable display panel 110 surrounding the electronic system 130, and may be an inner circle or a first circle. The second region 114 of the rollable display panel 110 may be a portion other than the first region 113, and may be an outer circle or a second circle, surrounding the first region 113 (the inner circle). Because the electronic system 130 generates heat, the first region 113 of the rollable display panel 110 surrounding the electronic system 130 is directly affected by the heat to have influences on the performance of the panel. According to some embodiments, a heat dissipation sheet may be provided on some place of the first region 113 of the rollable display panel 110 to be able to improve the heat dissipation efficacy of the electronic system 130, so that the rollable display panel 110 is less affected by the heat source of the electronic system 130. According to some embodiments, a heat dissipation sheet is provided in at least some region of the first region 113 of the rollable display panel 110.

Figure 2:
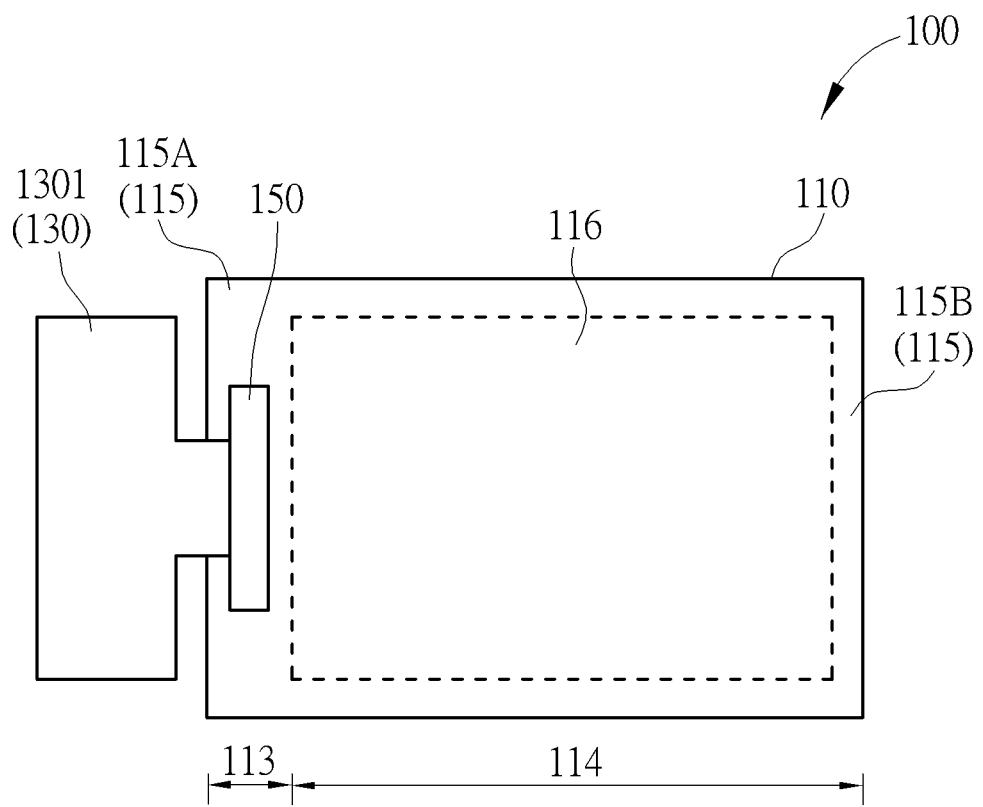
FIG. 2 is a schematic top view of the display device according to the first embodiment of the present disclosure after being fully unrolled.
Figure 3:
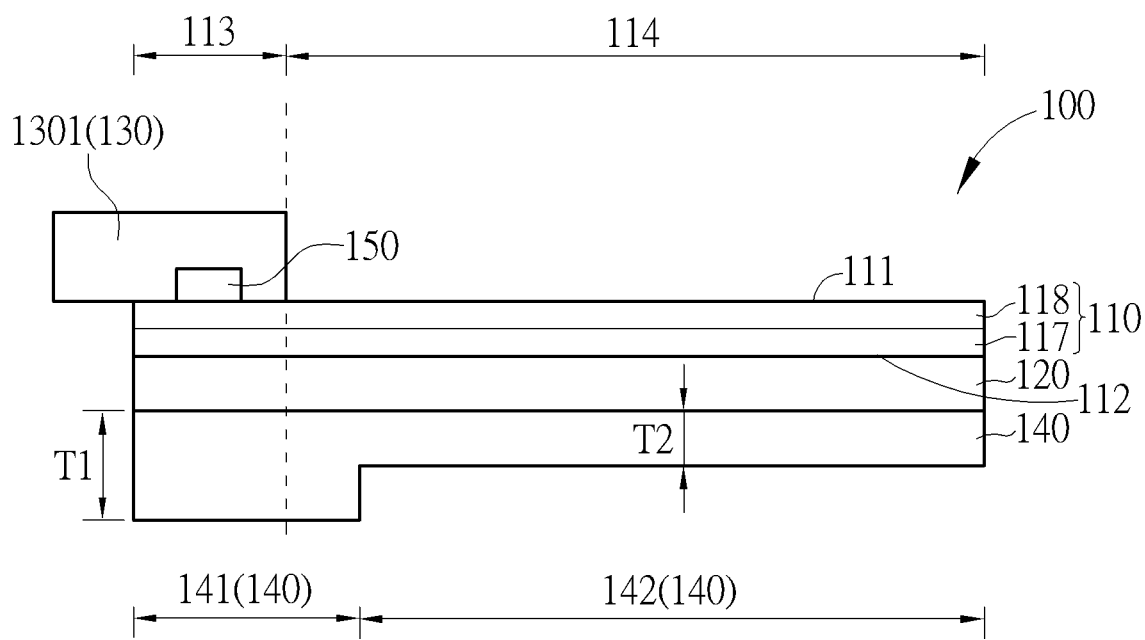
FIG. 3 is a schematic side view corresponding to FIG. 2.

FIG. 2 is a schematic top view of the display device 100 according to the first embodiment of the present disclosure after being fully unrolled, and FIG. 3 is a schematic side view corresponding to FIG. 2. Please refer to FIG. 2, the rollable display panel 110 may include a bonding pad 150. The flexible board module 1301 of the electronic system 130 of the display device 100 may be physically connected to the rollable display panel 110, or the flexible board module 1301 may also be electrically connected to the rollable display panel 110 via the bonding pad 150. According to some embodiments, the rollable display panel 110 may include a peripheral area 115 and an active area 116. According to some embodiments, the peripheral area 115 may be located outside of the active area 116, for example, the peripheral area 115 may surround the active area 116. According to some embodiments, a part of the peripheral area 115 (the part 115A of the peripheral area as shown in FIG. 2) may be disposed between the active area 116 and the electronic system 130, or a part 115A of the peripheral area 115 may be closer to the electronic system 130 than the active area 116. As shown in FIG. 2, the first region 113 of the rollable display panel 110 may be closer to the part 115A of the peripheral area of the electronic system 130, and the second region 114 may be a portion other than the first region 113. For example, the second region 114 may include the active area 116 and a part 115B of the peripheral area farther away from the electronic system 130.

Please refer to FIG. 3, which is a schematic side view of the display device 100 in an unrolled state. The rollable display panel 110 may include a flexible substrate 117 and a display layer 118 disposed on the flexible substrate 117. As shown in FIG. 3, according to some embodiments, the heat dissipation sheet 140 may include a first portion 141 and a second portion 142. The bonding pad 150 may be disposed closer to the first portion 141 and farther away from the second portion 142. In other words, the bonding pad 150 may be disposed closer to the first portion 141 than the second portion 142. The first portion 141 may have a better heat dissipation characteristic, for example, have a better heat dissipation characteristic than the second portion 142, but the present disclosure is not limited thereto. The better heat dissipation characteristic of the first portion 141 may be performed by means of a larger thickness, or performed by means of a material with a larger thermal conductivity, or performed by means of the two. Optionally, the first portion 141 and the second portion 142 of the heat dissipation sheet 140 may be interchanged. For example, the second portion 142 may be closer to the bonding pad 150 than the first portion 141.

According to some embodiments, as shown in FIG. 3, the first portion 141 of the heat dissipation sheet 140 may be disposed corresponding to the first region 113 of the rollable display panel 110, and the second portion 142 of the heat dissipation sheet 140 may be disposed corresponding to the second region 114 of the rollable display panel 110, but the present disclosure is not limited thereto. For example, the first region 113 is closer to the electronic system 130 than the second region 114, and the first portion 141 may also be closer to the electronic system 130 than the second portion 142. According to some embodiments, the first region 113 is closer to the axis 109 for rolling than the second region 114, and the first portion 141 may be closer to the axis 109 than the second portion 142 (shown in FIG. 1). According to some embodiments, as shown in FIG. 1, the first region 113 may be an inner circle so the first portion 141 also corresponds to the inner circle, and the second region 114 is an outer circle so the second portion 142 may also correspond to the outer circle. According to some embodiments, compared to the second region 114, the first region 113 may be closer to the heat source, and is a portion with higher heat dissipation requirements than the second region 114. For example, the heat source may include the electronic system 130. According to some embodiments, the first region 113 may be a fixed rolling region, and the second region 114 may be a re-rollable region (a to-and-fro rolling region). According to some embodiments, the rollable display panel 110 within the first region 113 may be fixedly accommodated in a housing, and the rollable display panel 110 within the second region 114 may be pulled out of the housing. The following embodiments respectively describe implementations of the first region 113 and of the second region 114, and implementations of the first portion 141 and of the second portion 142 of the heat dissipation sheet 140.

According to some embodiments, please refer to FIG. 3, the first region 113 may be a fixed rolling region, and the second region 114 may be a to-and-fro rolling region. The first portion 141 of the heat dissipation sheet 140 may be disposed corresponding to the first region 113, and the second portion 142 may be disposed corresponding to the second region 114. The design of the first portion 141 of the heat dissipation sheet 140 having a larger thickness than the second portion 142 may provide the fixed rolling region with a better heat dissipation characteristic.

According to some embodiments, the boundary between the first portion 141 and the second portion 142 of the heat dissipation sheet 140 may be the same as the boundary between the first region 113 and the second region 114 of the rollable display panel 110. Or alternatively, according to some embodiments, the boundary between the first portion 141 and the second portion 142 of the heat dissipation sheet 140 may be different from the boundary between the first region 113 and the second region 114 of the rollable display panel 110. According to some embodiments, the first portion 141 of the heat dissipation sheet 140 corresponds to the first region 113 of the rollable display panel 110, and the second portion 142 of the heat dissipation sheet 140 corresponds to the second region 114 of the rollable display panel 110. Specifically speaking, the first region 113 of the rollable display panel 110 may be an inner circle. For example, as shown in FIG. 3, at least some portion of the first portion 141 of the heat dissipation sheet 140 is disposed within the first region 113 (the inner circle) of the rollable display panel 110, and at least some portion of the second portion 142 of the heat dissipation sheet 140 is disposed within the second region 114 (the outer circle) of the display panel 110. As shown in FIG. 3, some portion of the first portion 141 of the heat dissipation sheet 140 is disposed within the first region 113 (the inner circle) of the rollable display panel 110, and other portion of the first portion 141 of the heat dissipation sheet 140 may be disposed within the second region 114. Although not shown in the figure, according to some embodiments, the entire of the first portion 141 of the heat dissipation sheet 140 may be disposed within the first region 113. At least some portion of the second portion 142 of the heat dissipation sheet 140 may be disposed within the second region 114, and other portion of the second portion 142 may be disposed within the first region 113.

According to some embodiments, the better heat dissipation characteristic of the first portion 141 may be performed by means of the larger thickness T1 of the first portion 141. For example, the first region 113 of the rollable display panel 110 is closer to the electronic system 130 and may be a region requiring high heat dissipation ability. FIG. 3 illustrates that the first portion 141 may correspond to the region requiring high heat dissipation ability (the first region 113), and the thickness T1 of the first portion 141 may be greater than the thickness T2 of the second portion 142. For example, the thickness T1 of the first portion 141 is larger than the thickness T2 so that the first portion 141 disposed on the heat dissipation sheet 140 has a better heat dissipation characteristic. The larger thickness T1 of the first portion 141 is beneficial to quickly dissipate the heat of the electronic system 130 to the entire first portion 141 and then to the second portion 142. The thickness T1 of the first portion 141 is thicker so that sufficient heat energy may be smoothly transferred to the heat dissipation sheet 140 to make the heat dissipation sheet 140 have better utilization efficiency.

Figure 4:
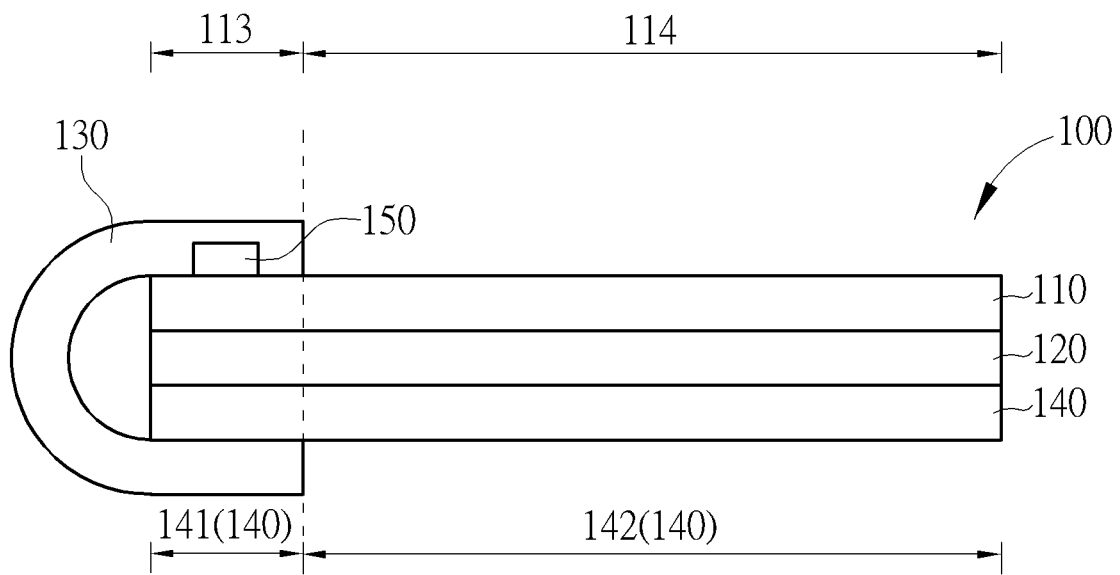
FIG. 4 is a schematic side view of a variant embodiment corresponding to FIG. 2.

According to some embodiments, a better heat dissipation characteristic of the first portion 141 may be performed by means of a material of the first portion 141 with a greater thermal conductivity. For example, the thermal conductivity of a material of the first portion 141 may be greater than the thermal conductivity of a material of the second portion 142. Optionally, the thickness of the first portion 141 and of the second portion 142 may be the same or different as needed. FIG. 4 is a schematic side view of a variant embodiment corresponding to FIG. 2. The heat dissipation sheet 140 may have a thermal conductivity greater than 200 W/mK. FIG. 4 illustrates that the first portion 141 may correspond to a portion requiring high heat dissipation ability (the first region 113), and the thermal conductivity of the first portion 141 may be greater than the thermal conductivity of the second portion 142. The suitable materials of the heat dissipation sheet 140 may include diamond, silver, copper, gold, aluminum, graphite, and a combination thereof, but the present disclosure is not limited thereto. If the first portion 141 of the heat dissipation sheet 140 uses a material with a greater thermal conductivity, it may be beneficial to quickly dissipate the heat of the electronic system 130 to the first portion 141. According to some embodiments, if the heat dissipation sheet 140 includes a composite material, the thermal conductivity of the heat dissipation sheet 140 may reside in the thermal conductivity of the material with the greatest thermal conductivity. The thermal conductivity may be measured by looking up the tables to obtain the thermal conductivity corresponding to each component (or element) after analyzing the various components (or elements) of a heat dissipation sheet. Or alternatively, it may also be obtained by measuring a heat dissipation sheet with a thermal conductivity analyzer. According to some embodiments, the better heat dissipation characteristic of the first portion 141 may also be performed by means of the greater thermal conductivity of the first portion 141 to go with a larger thickness T1 together.

Please refer to FIG. 4 again. In addition to the electronic system 130 physically connected to the rollable display panel 110, the electronic system 130 may also be physically connected to the heat dissipation sheet 140 by means of extension. For example, the electronic system 130 may also be bent backwards extending toward the back side of the rollable display panel 110 by rolling so that the two end points of the electronic system 130 may be respectively physically connected to the rollable display panel 110 and to the first portion 141 of the heat dissipation sheet 140. Such a configuration is beneficial to dissipate the heat of the electronic system 130 directly and quickly to the first portion 141.

Figure 5:
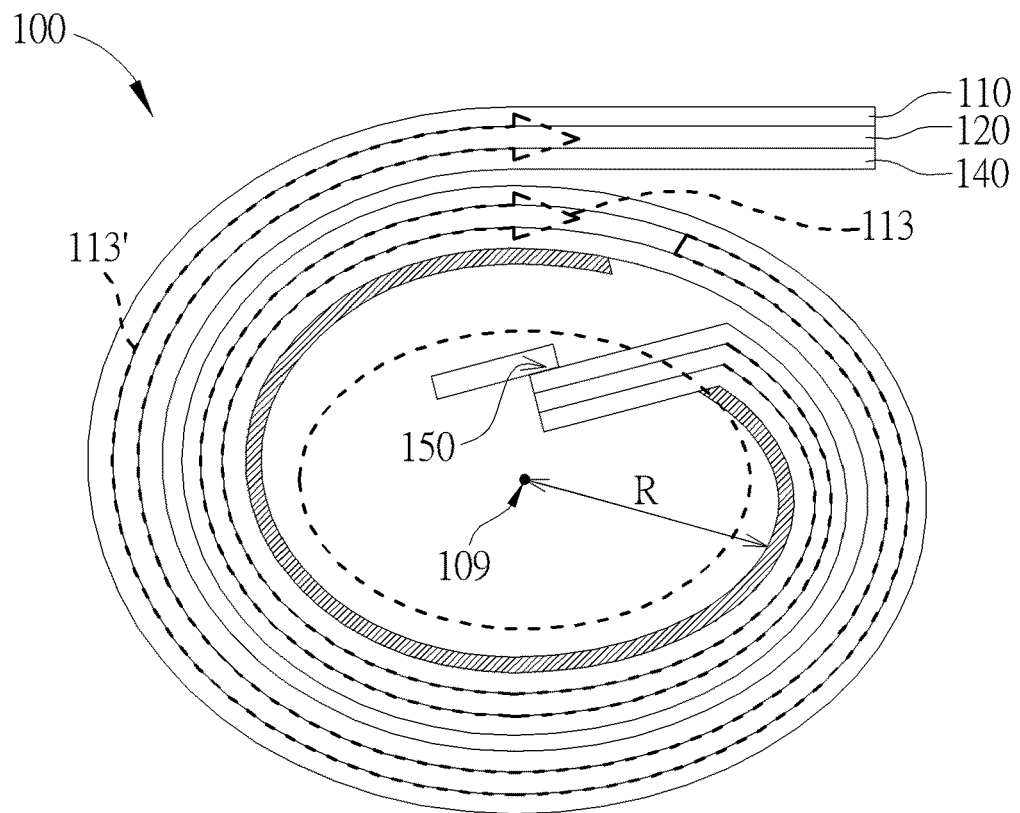
FIG. 5 is a schematic diagram of the display device in a partially rolled state according to the second embodiment of the present disclosure.

FIG. 5 is a schematic diagram of the display device 100 in a partially rolled state according to the second embodiment of the present disclosure. According to the display device 100 of the second embodiment of the present disclosure, in a rolled state or a half-rolled state, it is possible that a second circle 113' rolls to surround the first region 113 serving as the first circle. A rolled state may be a state which has curvature of most of the rollable display panel 110 or of the heat dissipation sheet 140. The region of the rollable display panel 110 closer to the axis 109 may be referred to as a fixed rolling region of the rollable display panel 110. In some embodiments, a fixed rolling region may be, for example, the first region 113 corresponding to the rollable display panel 110. Whether it is in a rolled state or in an unrolled state, the fixed rolling region is kept rolled, that is, to form the first circle surrounding the electronic system 130. The fixed rolling region may not have a display function or provide no display. The region other than the fixed rolling region of the rollable display panel 110 may be referred to as a to-and-fro rolling region of the rollable display panel 110. The to-and-fro rolling region may, for example, include the second circle 113' and correspond to the second region 114. When the rollable display panel 110 is in an unrolled state, the to-and-fro rolling region is generally unrolled to become a plane (as shown in FIG. 1).

Figure 6:
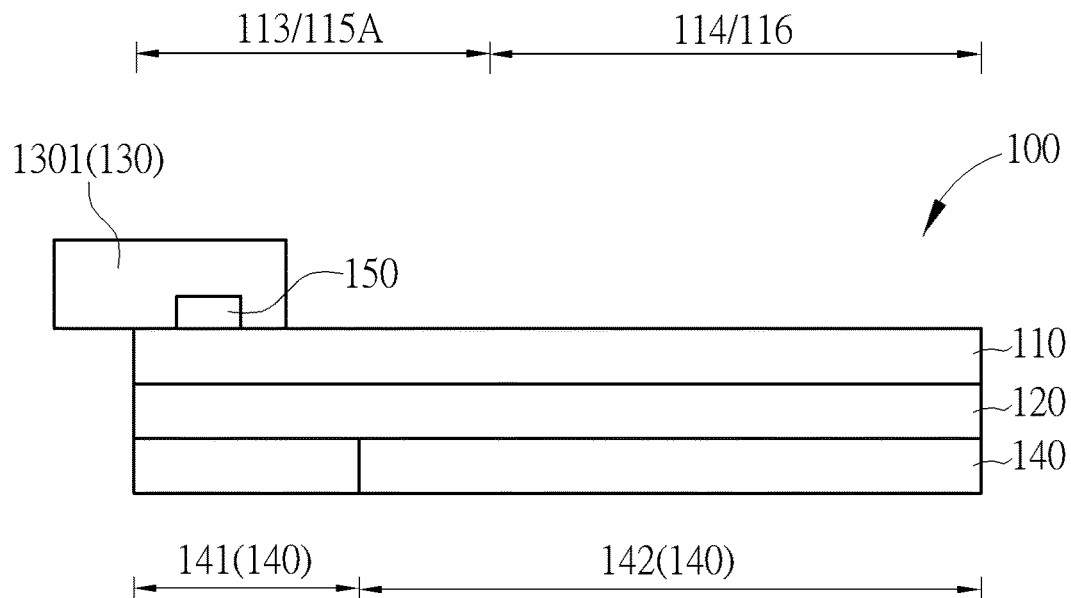
FIG. 6 is a schematic side view of an implementation corresponding to FIG. 2.

FIG. 6 is a schematic side view of an implementation corresponding to FIG. 2. According to some embodiments, the active area 116 of the rollable display panel 110 may be designed in some region after the first circle. In details, the second region 114 of the rollable display panel 110 may include the active area 116, and the first region 113 of the rollable display panel 110 may include a part 115A of the peripheral area close to the electronic system 130. As shown in FIG. 6, the first portion 141 of the heat dissipation sheet 140 corresponds to the first region 113 of the rollable display panel 110, and the second portion 142 of the heat dissipation sheet 140 corresponds to the second region 114 of the rollable display panel 110. For example, at least some portion of the first portion 141 of the heat dissipation sheet 140 may be disposed within the first region 113, and at least some portion of the second portion 142 of the heat dissipation sheet 140 may be disposed within the second region 114 (the active region 116). Such a design is beneficial to reduce the probability of display abnormality of the display device 100 due to heat, and thus may increase the reliability of the rollable display device 100. Specifically speaking, the first region 113 of the rollable display panel 110 may be the part 115A of the peripheral area close to the electronic system 130. For example, as shown in FIG. 6, according to some embodiments, all of the first portion 141 of the heat dissipation sheet 140 may be disposed within the first region 113 (the part 115A of the peripheral area). At least some portion of the second portion 142 of the heat dissipation sheet 140 may be disposed within the second region 114 (the active area 116), and other portion of the second portion 142 may be disposed within the first region 113. Although not shown in the figure, according to some embodiments, a portion of the first portion 141 of the heat dissipation sheet 140 is disposed within the first region 113 (the part 115A of the peripheral area) of the rollable display panel 110, and other portion of the first portion 141 is disposed within the second region 114 (the active area 116) of the rollable display panel 110, and all of the second portion 142 of the heat dissipation sheet 140 is disposed within the second region 114 (the active area 116) of the rollable display panel 110.

Figure 7:
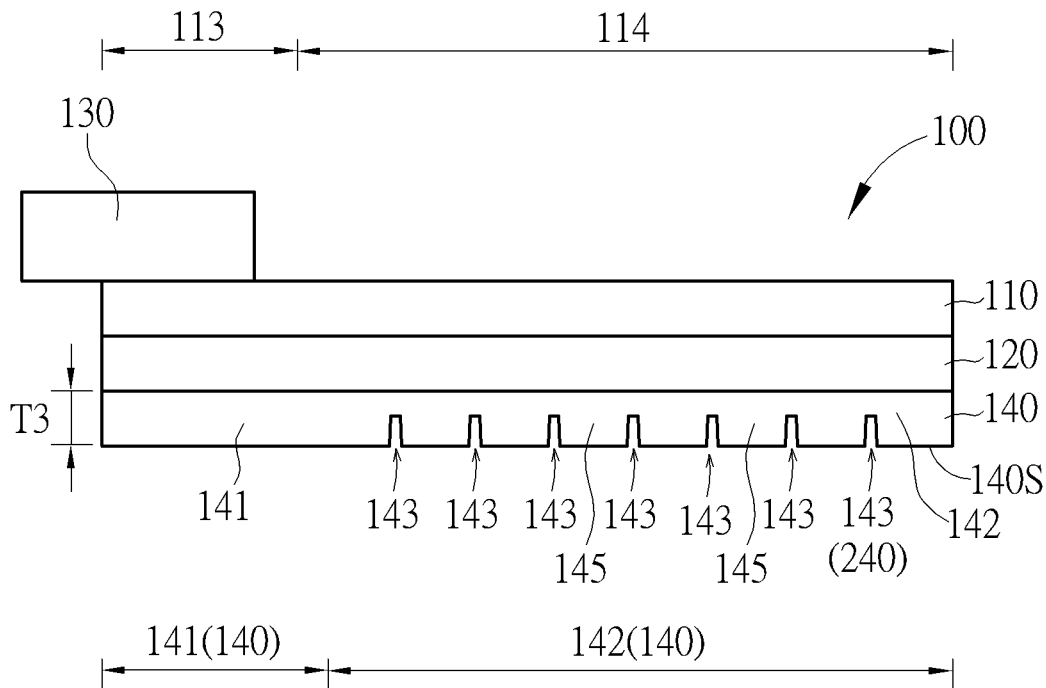
FIG. 7 is a schematic side view of another variant implementation corresponding to FIG. 2.

According to some embodiments, the surface of the heat dissipation sheet 140 may be provided with an opening 240. The opening 240 may be a recess and/or a trench. FIG. 7 is a schematic side view of another variant implementation corresponding to FIG. 2. The thickness of the heat dissipation sheet 140 in the fixed rolling region (the first region 113) may be T3, and the thickness of the heat dissipation sheet 140 in the to-and-fro rolling region (the second region 114) has a smaller thickness. The heat dissipation sheet 140 may include at least one recess 143 so that a protrusion 145 of the heat dissipation sheet 140 may be formed between the recesses 143. The recess 143 may be recessed into the surface 140S of the heat dissipation sheet 140, but the recess 143 may not expose the rollable display panel 110 or the supporting plate 120 on the other side of the heat dissipation sheet 140. In other words, the recess 143 may not penetrate the heat dissipation sheet 140. By providing at least one recess 143 on the heat dissipation sheet 140, the average thickness of the heat dissipation sheet 140 may be reduced. The heat-dissipating surface area of the heat dissipation sheet 140 may also be increased, and/or the flexibility of the to-and-fro rolling region may also be increased to facilitate to increase the reliability of the rollable display panel 110 in the to-and-fro rolling region (the second region 114). The calculation method of the average thickness is shown in FIG. 9 and in the corresponding descriptions below.

Figure 8:
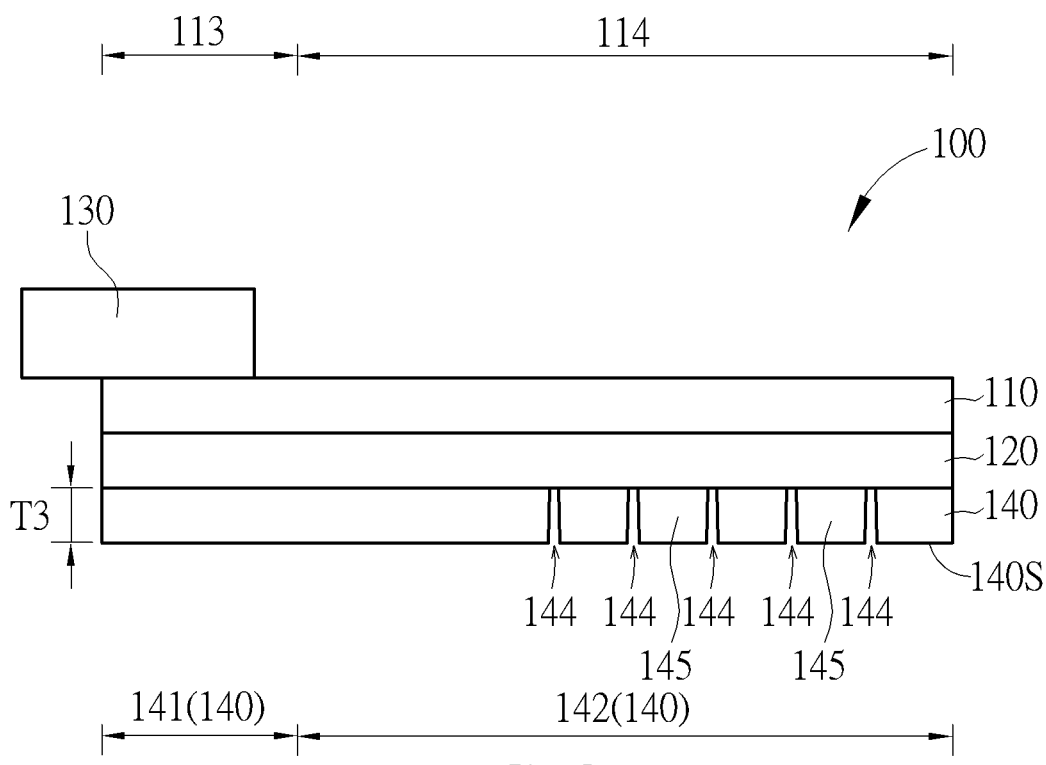
FIG. 8 is a schematic side view of another variant implementation corresponding to FIG. 2.

FIG. 8 is a schematic side view of another variant implementation corresponding to FIG. 2. The heat dissipation sheet 140 may include at least one opening 240 (a trench 144). The trench 144 may be recessed into the surface 140S of the heat dissipation sheet 140, and the bottom of the trench 144 may also expose some part of the rollable display panel 110 or of the supporting plate 120. FIG. 8 illustrates that the trench 144 may expose some part of the supporting plate 120. In other words, the trench 144 may penetrate the heat dissipation sheet 140 so that a protrusion 145 of the heat dissipation sheet 140 may be formed between the trenches 144. With the design of the opening 240, the average thickness of the heat dissipation sheet 140 may be reduced. In addition, the heat-dissipating surface area of the heat dissipation sheet 140 may also be increased, and/or the flexibility of the to-and-fro rolling region may also be increased, to more beneficially increase the reliability of the rollable display panel 110 in the to-and-fro rolling region.

Figure 9:
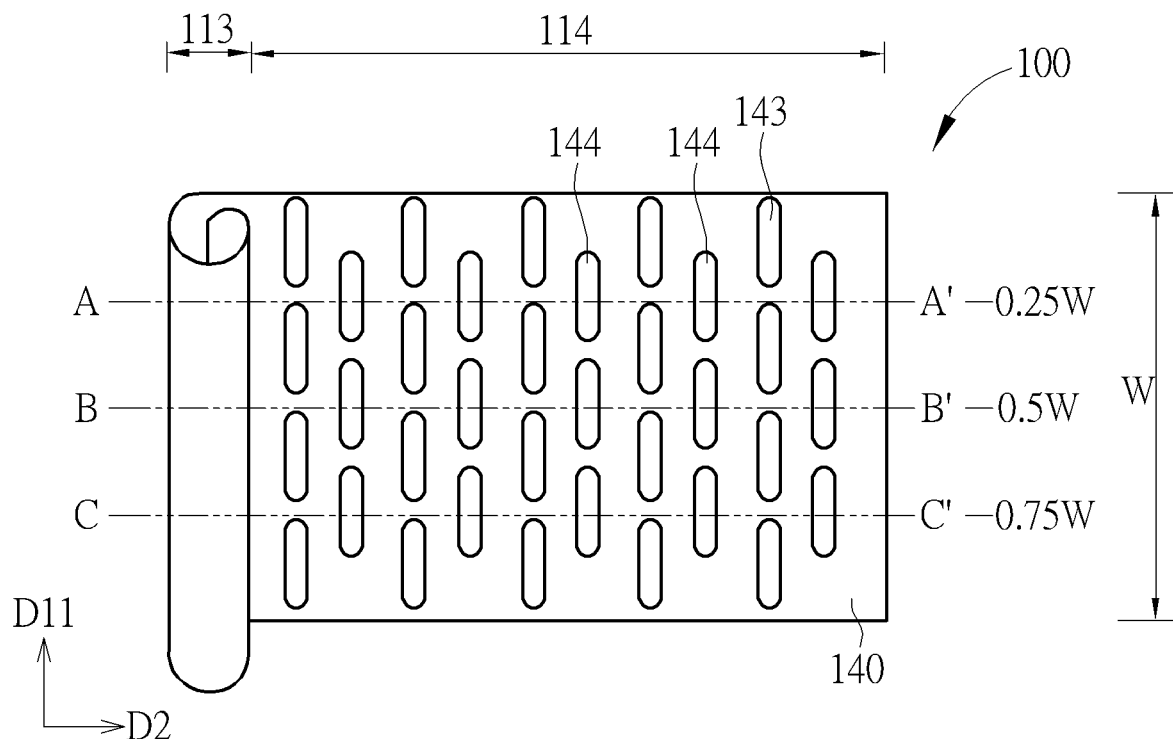
FIG. 9 is a schematic bottom view according to an implementation of the present disclosure.
Figure 10:
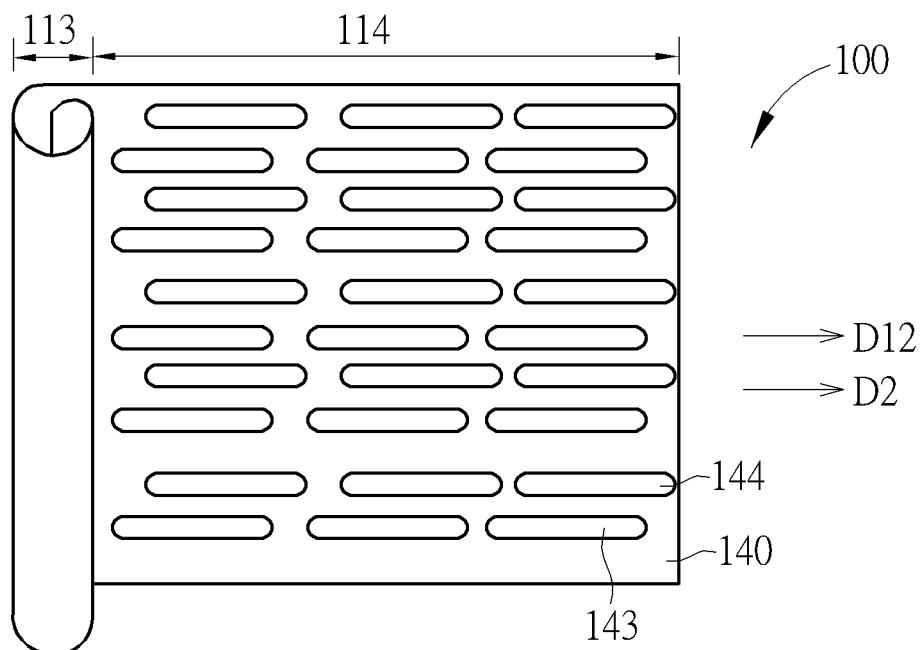
FIG. 10 is a schematic bottom view according to an implementation of the present disclosure.

FIG. 9 is a schematic bottom view according to an implementation of the present disclosure. According to some embodiments, as shown in FIG. 9, the heat dissipation sheet 140 may include a plurality of openings 240. The opening 240 may be a recess 143, a trench 144, or a combination thereof. The extending direction D11 of the recess 143 or of the trench 144 may be perpendicular to the unrolling direction D2 of the display device 100. As shown in FIG. 10, the extending direction D12 of the recess 143 or of the trench 144 may be designed to be parallel to the unrolling direction D2 of the display device 100. The calculation method of the average thickness of the heat dissipation sheet 140 is as follows. Please refer to the method shown in FIG. 9. For example, the width of the heat dissipation sheet 140 is W, and the width W may be the width in the direction perpendicular to the unrolling direction D2 of the display device 100. The width of the heat dissipation sheet 140 may be divided into four quarters, such as 0.25 W, 0.5 W, 0.75 W are taken, and the total thicknesses of 10 points along each horizontal line are respectively measured and then averaged to get the average thickness of the heat dissipation sheet 140, but the present disclosure is not limited thereto. If the designs of the first portion 141 are different from the designs of the second portion 142 of the heat dissipation sheet 140, the average thicknesses of the first portion 141 and of the second portion 142 may be calculated separately. According to some embodiments, the first portion 141 of the heat dissipation sheet 140 may be provided corresponding to the first region 113, and the second portion 142 may be provided corresponding to the second region 114. The thickness of the first portion 141 in the first region 113 may be measured, and the thickness of the second portion 142 in the second region 114 may be measured. The thicknesses of the first portion 141 and of the second portion 142 of the heat dissipation sheet 140 in the first region 113 and in the second region 114 may be respectively measured by referring to the above-mentioned method of dividing the width of the heat dissipation sheet 140 into four quarters. For every 10 points taken in a portion, the distance between two adjacent points may be equal. In other words, there may be 10 points of the same pitch. However, the measurement of the average thickness is not limited thereto. According to some embodiments, two points in one portion may also be taken for the thickness measurement. According to some embodiments, samples of the heat dissipation sheet 140 of the same size, for example, a sample of 1 cm', may be taken respectively out of the first region 113 and out of the second region 114 of the rollable display panel 110 to be subjected to the measurement of the thickness. According to some embodiments, the thickness of the heat dissipation sheet 140 may not be limited to the average thickness, and may also be the thickness at a specific location.

Figure 11:
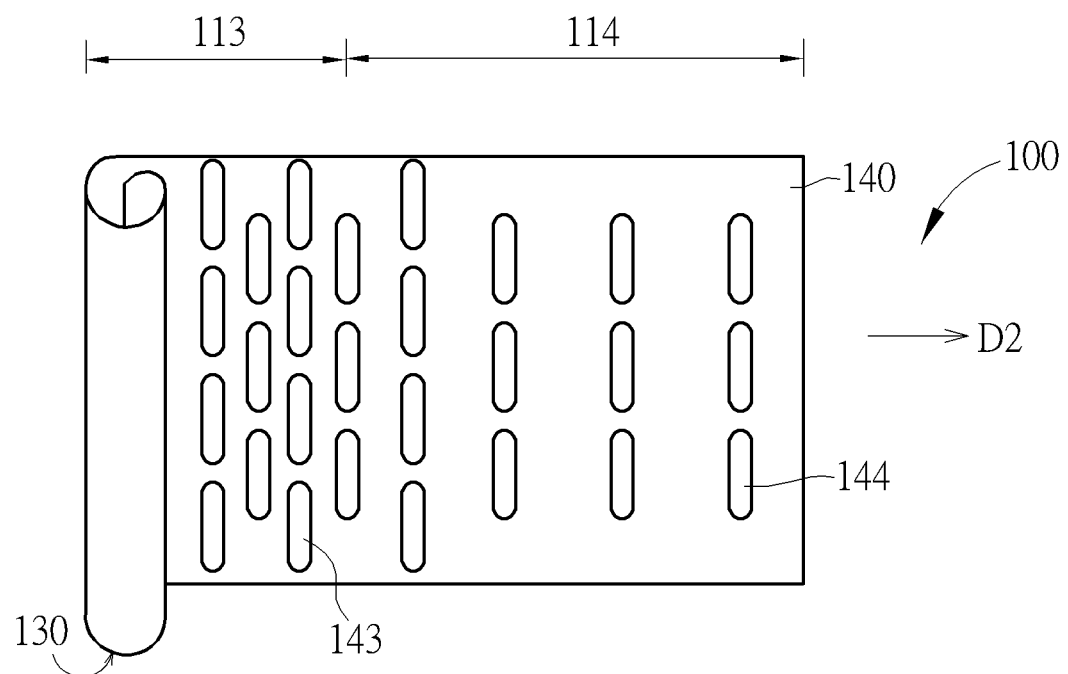
FIG. 11 is a schematic bottom view according to an implementation of the present disclosure.

FIG. 11 is a schematic bottom view of an implementation according to the present disclosure. In another implementation of the present disclosure, as shown in FIG. 11, the recesses 143 or the trenches 144 may form an uneven distribution along the unrolling direction D2 of the display device 100, so that the average thickness of different portions may be different. For example, if the flexibility requirement of the first region 113 is greater than that of the second region 114, the region closer to the first region 113 of the electronic system 130 may be optionally provided with more recesses 143 or trenches 144 as needed, that is, the distribution density of the recesses 143 or of the trenches 144 may be larger, where the distribution density may represent the number of the recesses 143 or of the trenches 144 per unit area of the heat dissipation sheet 140, or the area occupied by the recesses 143 or by the trenches 144 per unit area of the heat dissipation sheet 140, but the present disclosure is not limited thereto.

Figure 12:
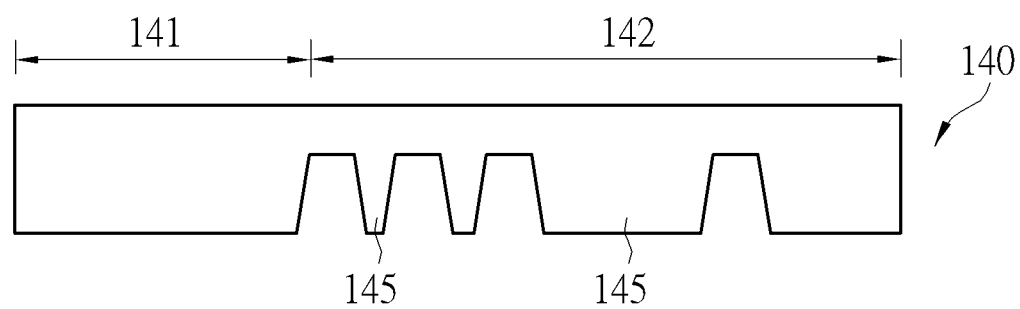
FIG. 12 illustrates a schematic side view according to a variant implementation of the heat dissipation sheet of the present disclosure.

FIG. 12 illustrates a schematic side view of a variant implementation of the heat dissipation sheet 140. The heat dissipation sheet 140 may have one or more protrusions 145. For example, the heat dissipation sheet 140 may include a first portion 141 and a second portion 142, and a plurality of protrusions 145 may be provided in the to-and-fro rolling region corresponding to the second portion 142. The density of the protrusions 145 may be optionally different, but the present disclosure is not limited thereto. The protruding portion 145 may increase the heat-dissipating surface area of the heat dissipation sheet 140, or may also increase the flexibility of the to-and-fro rolling region, thereby facilitating to increase the reliability of the rollable display panel 110 in the to-and-fro rolling region. The density of the protrusions 145 may adjust the rolling radius R of the rollable display panel 110.

Figure 13:
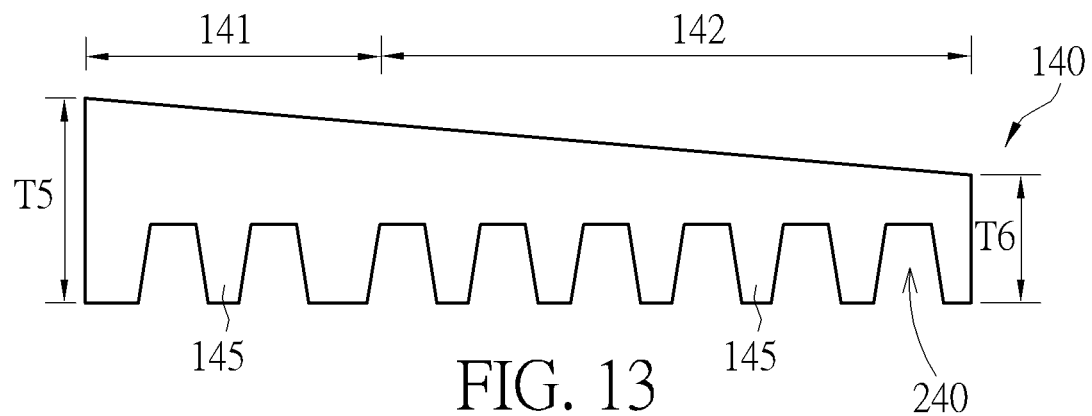
FIG. 13 illustrates a schematic side view according to a variant implementation of the heat dissipation sheet of the present disclosure.

FIG. 13 is a schematic side view of a variant implementation of the heat dissipation sheet 140. The thickness T5 of the first portion 141 of the heat dissipation sheet 140 may be greater than the thickness T6 of the second portion 142. The first portion 141 and the second portion 142 may be evenly provided with the protrusions 145 and with the openings 240, but the present disclosure is not limited thereto. The greater thickness of the fixed rolling region may make sufficient heat energy smoothly dissipated to all the protrusions 145, so that all the protrusions 145 are most efficiently used.

Figure 14:
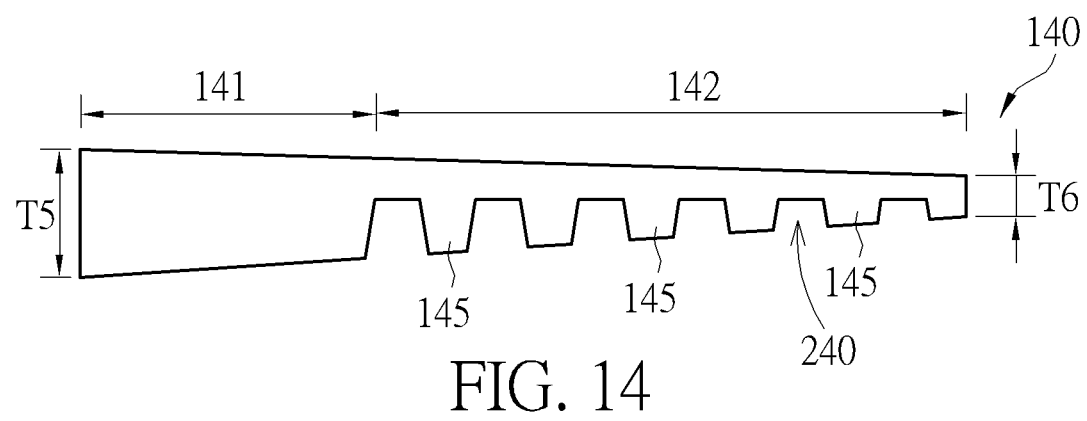
FIG. 14 illustrates a schematic side view according to a variant implementation of the heat dissipation sheet of the present disclosure.

FIG. 14 is a schematic side view of a variant implementation of the heat dissipation sheet 140. One or more protrusions 145 and openings 240 may be evenly provided in the second portion 142 of the heat dissipation sheet 140. The thickness T5 of the first portion 141 of the heat dissipation sheet 140 may be greater than the thickness T6 of the second portion 142, but the present disclosure is not limited thereto. The thickness design of this variant implementation reduces from the first portion 141 which is closer to the electronic system to the second portion 142, so that the heat dissipation sheet 140 may absorb enough heat from the electronic system part to quickly dissipate it to the surrounding thinner portion.

Figure 15:
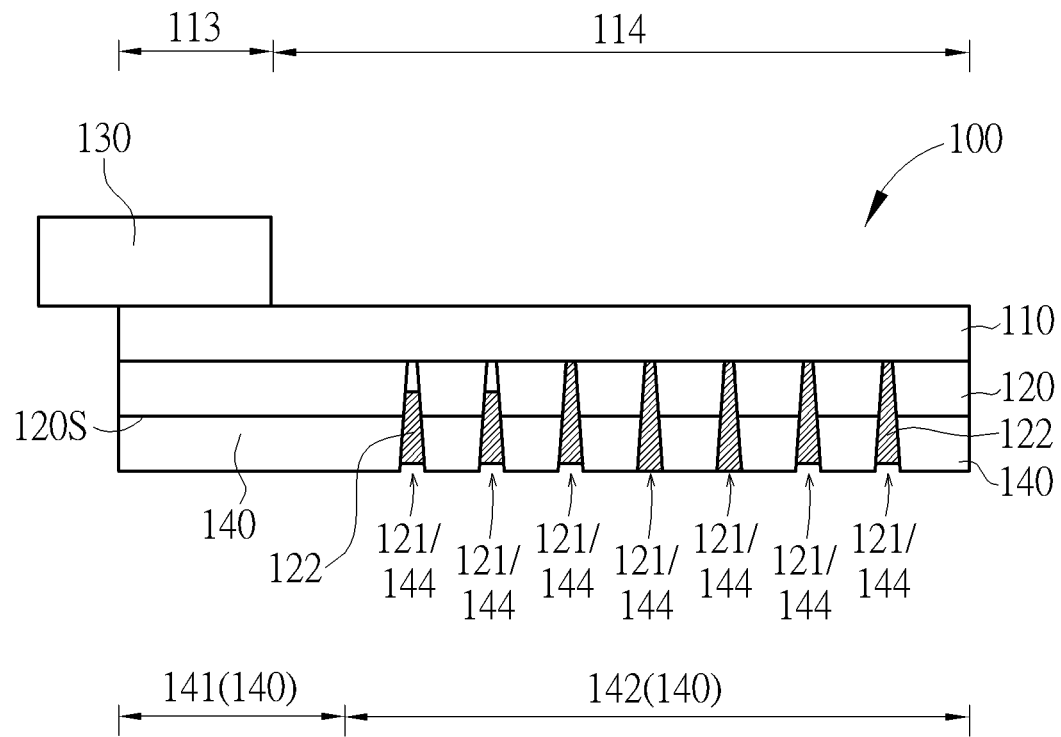
FIG. 15 is a schematic side view of the display device according to the third embodiment of the present disclosure.

FIG. 15 is a schematic side view of the display device 100 according to the third embodiment of the present disclosure. If it is needed to increase the heat dissipation characteristic of the display device 100, it may also be performed by means of deepening a trench 121 of the heat dissipation sheet 140 into the optional supporting plate 120. For example, the heat dissipation sheet 140 may include a first portion 141 disposed in the first region 113 and a second portion 142 disposed in the second region 114. There may be at least one trench 121 in the optional supporting plate 120. At least one trench 121 of the supporting plate 120 may be recessed into the surface 120S of the supporting plate 120, and the trench 121 may further expose a region of the rollable display panel 110. The trench 121 goes deep into the surface 120S of the supporting plate 120, or the supporting plate 120 may also be designed to be thinner to increase the flexibility of the to-and-fro rolling region when being frequent rolled, and to be beneficial to increase the reliability of the rollable display panel 110 in the to-and-fro rolling region. The location of the trench 144 of the heat dissipation sheet 140 may coincide with the location of the hole of the trench 121 of the supporting plate 120 to reduce the risk of peeling off of the two layers when the rollable display panel 110 is rolled to maintain the adhesion between the two layers. According to some embodiments, an auxiliary heat dissipation material 122 may also be used to fill the trench 121 and/or the trench 144. For example, the auxiliary heat dissipation material 122 may fill some of the trenches 121 and/or of the trenches 144, or the auxiliary heat dissipation material 122 may partially fill the trenches 124 and/or the trenches 144 without filling up the trenches 121 and/or trenches 144, but the present disclosure is not limited thereto. The auxiliary heat dissipation material 122 may be thermal grease, thermal gel, or a combination thereof, but the present disclosure is not limited thereto.

Figure 16:
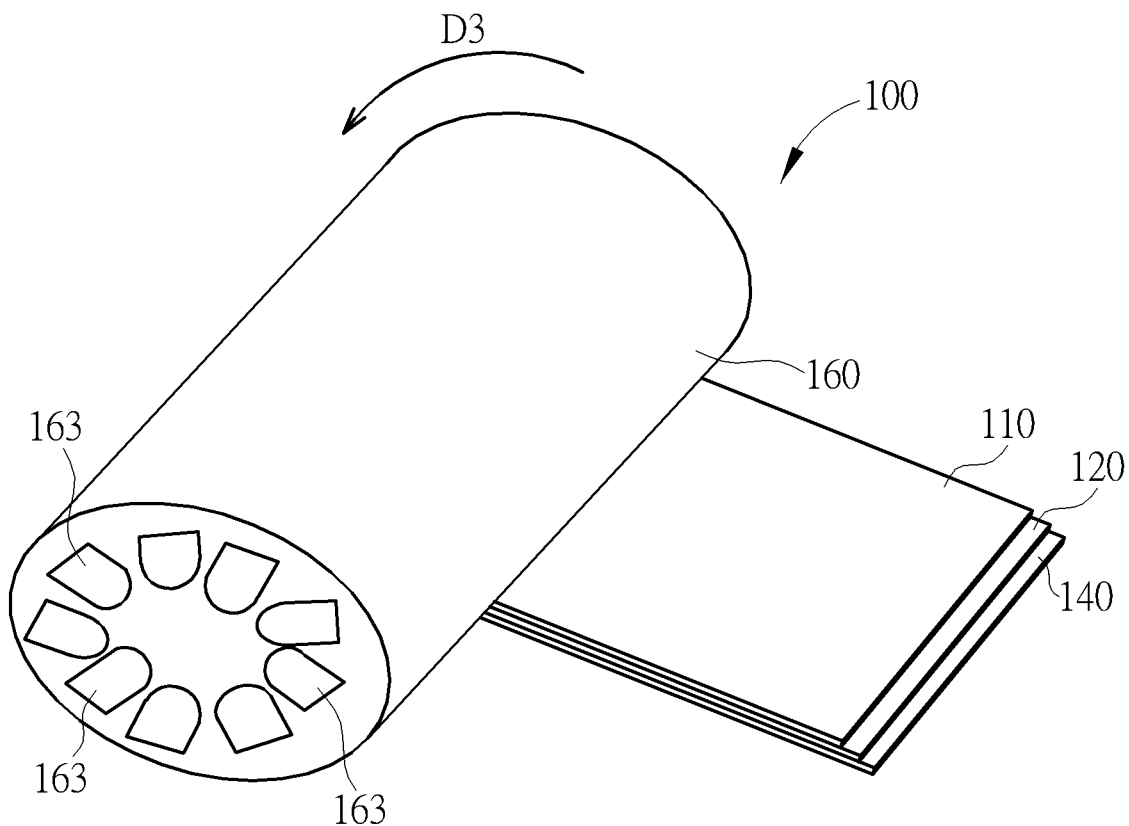
FIG. 16 is a schematic diagram of the display device in an unrolled state according to the fourth embodiment of the present disclosure.

FIG. 16 is a schematic diagram of the display device 100 in an unrolled state according to the fourth embodiment of the present disclosure. According to some embodiments, in FIG. 16, at least some of the rollable display panel 110 is unrolled. The display device 100 of the fourth embodiment of the present disclosure may further include a housing 160. In a rolled state, the housing 160 may accommodate the rollable display panel 110 and the heat dissipation sheet 140. According to some embodiments, the housing 160 may accommodate the rollable display panel 110, the supporting plate 120, and an electronic system (not shown). When the housing 160 rotates in the D3 direction, the rollable display panel 110 may be pulled out from the housing 160 together with the heat dissipation sheet 140 to obtain the unrolled state of the display device 100. Please refer to the above, an electronic system (not shown) and/or the rollable display panel 110 may generate heat when the display device 100 is in use. According to the display device 100 of the fourth embodiment of the present disclosure, the display device 100 includes a housing 160, and at least some of the heat generated by the rollable display panel 110 may be dissipated by the housing 160 via the heat dissipation sheet 140. In other words, according to some embodiments, the heat-dissipating direction of the heat generated by the rollable display panel 110 may be: first through the heat dissipation sheet, and then through the housing. Theoretically, the direction of heat transfer is from high temperature to low temperature. Therefore, by respectively detecting the surface temperatures of the rollable display panel 110, of the heat dissipation sheet 140, and of the housing 160, the heat transfer direction may be identified from the temperature gradient. According to some embodiments, the detection location of the surface temperature of the rollable display panel 110 may be a location closer to the bonding pad 150. According to some embodiments, the detection location of the surface temperature of the rollable display panel 110 may be a location closer to the rolling axis. According to some embodiments, the detection location of the surface temperature of the rollable display panel 110 may be the first portion of the rollable display panel 110. According to some embodiments, the detection location of the surface temperature of the rollable display panel 110 may be a location corresponding to the first portion 141 of the heat dissipation sheet 140. According to some embodiments, the detection location of the surface temperature of the rollable display panel 110 may correspond to a location closer to the first portion 141 of the heat dissipation sheet 140.

Please refer to FIG. 3 together with FIG. 16. FIG. 3 shows the rollable display panel 110 in a fully unrolled state, and FIG. 16 shows some region of the rollable display panel 110 in a rolled state. Some region of the rollable display panel 110 may be rolled to be accommodated in a housing 160. According to some embodiments, the first region 113 of the rollable display panel 110 may be an interior housing region, that is, the second region 114 may be an exterior housing region. The first portion 141 of the heat dissipation sheet 140 may be disposed corresponding to the first region 113, and the second portion 142 may be disposed corresponding to the second region 114. In other words, the interior housing region may be the portion of the heat dissipation sheet 140 which is accommodated in the housing 160 when the display device 100 is in the fully unrolled state, and the exterior housing region may be the portion of the heat dissipation sheet 140 which is not accommodated in the housing 160 when the display device 100 is in the fully unrolled state. Compared with the exterior housing region, the interior housing region may have a better heat dissipation characteristic. The better heat dissipation of the interior housing region may be performed by means of a larger thickness T1 of the heat dissipation sheet 140 in the interior housing region (the first region 113). For example, the thickness T1 of the interior housing region may be greater than the thickness T2 of the exterior housing region (the second region 114). Please refer to the aforementioned descriptions for the details of the heat dissipation sheet 140 with a larger thickness T1 in the interior housing region.

Figure 17:
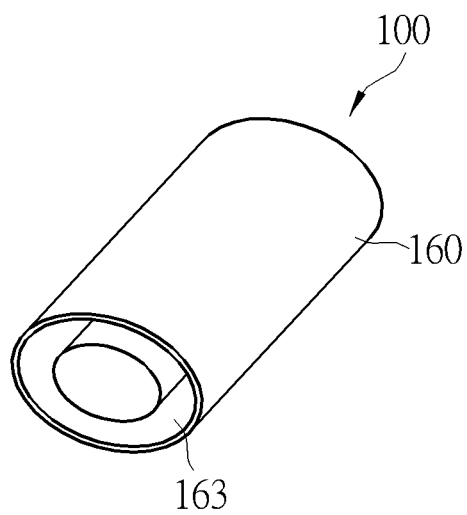
FIG. 17 is a schematic diagram of a variant embodiment of the display device according to the fourth embodiment of the present disclosure.

FIG. 17 is a schematic diagram of a variant embodiment of the display device 100 according to the fourth embodiment of the present disclosure. As shown in FIG. 16 or in FIG. 17, ventilation holes 163 may be provided in the housing 160 to increase the heat dissipation ability of the housing. The ventilation holes 163 on the housing 160 may include a plurality of holes as shown in FIG. 16, or concentric rings as shown in FIG. 17, but the present disclosure is not limited thereto.

Figure 18:
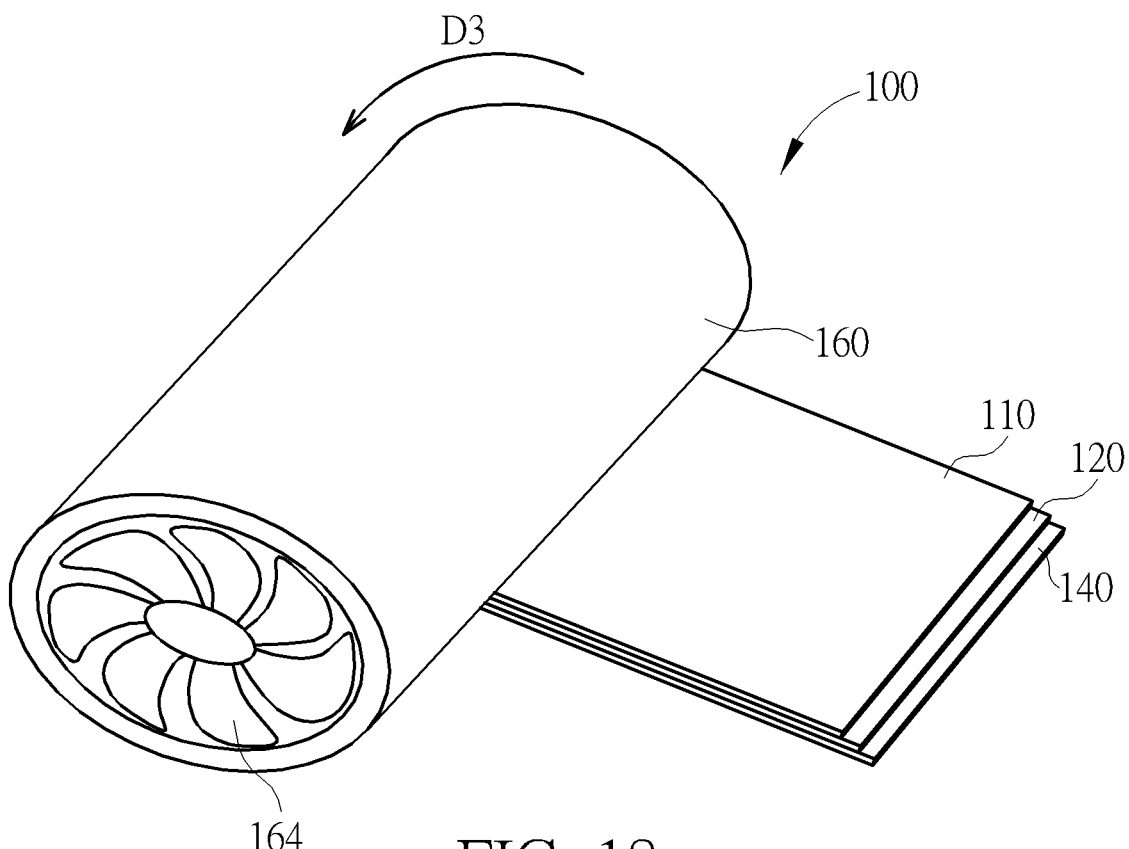
FIG. 18 is a schematic diagram of another variant embodiment of the display device according to the fourth embodiment of the present disclosure.

FIG. 18 is a schematic diagram of another variant embodiment of the display device 100 according to the fourth embodiment of the present disclosure. According to some embodiments, ventilation blades 164 may be provided in the housing 160 to increase the heat dissipation ability of the housing 160. For example, the ventilation blades 164 in the housing 160 may facilitate to generate air turbulence to increase the heat dissipation ability of the housing 160 when the heat dissipation sheet 140 is retracted into the housing 160 or pulled out of the housing 160 to rotate in the D3 direction, but the present disclosure is not limited thereto.

Figure 19:
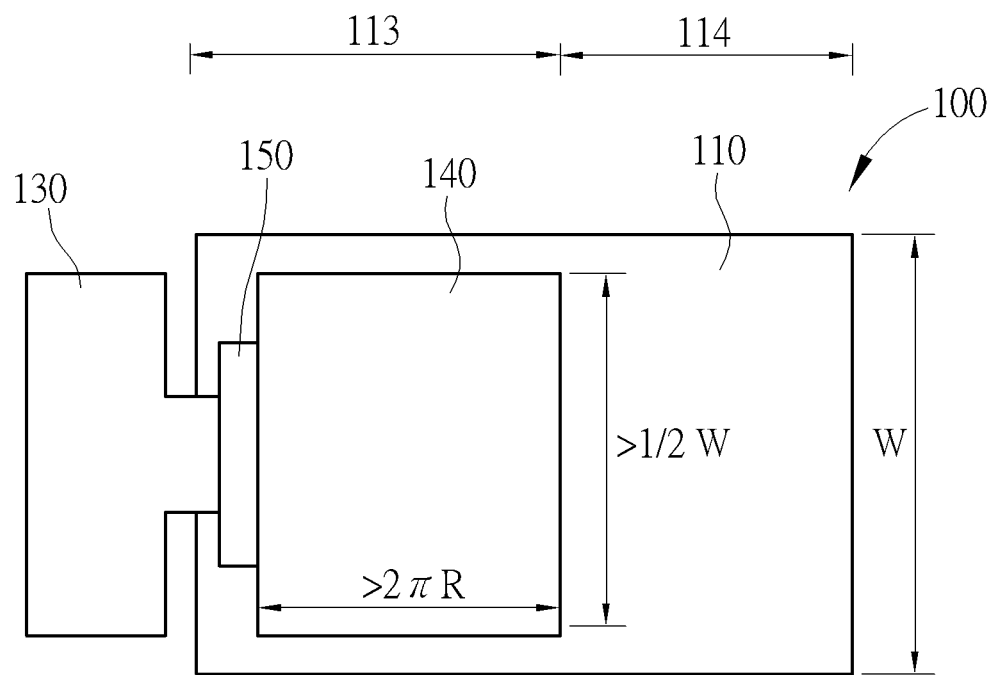
FIG. 19 is a schematic top view of the display device according to the fifth embodiment of the present disclosure corresponding to FIG. 1.

FIG. 19 is a schematic top view of the display device 100 according to the fifth embodiment of the present disclosure corresponding to FIG. 1. FIG. 19 shows the heat dissipation sheet 140 of the display device 100 to correspond to the size of the rolling radius R in the rolled state of FIG. 1. For example, according to some embodiments, the width of the heat dissipation sheet 140 may be greater than 0.5 W if the width of the rollable display panel 110 is W, but the present disclosure is not limited thereto. The length of the heat dissipation sheet 140 may be greater than 2πR when the rolling radius of the heat dissipation sheet 140 in the rolled state is R. A portion of the heat dissipation sheet 140 may still be exposed to the outside when the heat dissipation sheet 140 is in the rolled state corresponding to FIG. 1 as the length of the heat dissipation sheet 140 is greater than 2πR to facilitate to increase the heat dissipation ability of the heat dissipation sheet 140.

Figure 20:
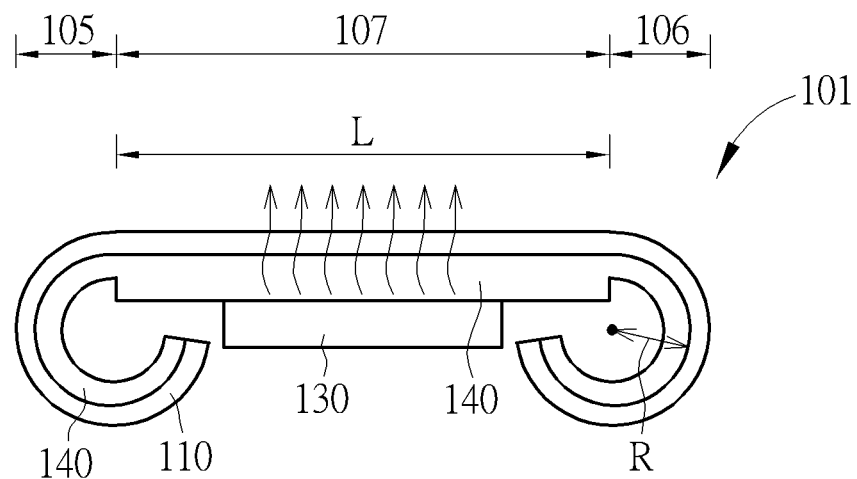
FIG. 20 is a schematic side view of a display device according to a variant embodiment of the fifth embodiment of the present disclosure.

FIG. 20 is a schematic side view of a display device 101 according to a variant embodiment of the fifth embodiment of the present disclosure. According to some embodiments, as shown in FIG. 20, the display device 100 may have more than one rollable portion, such as a first rollable portion 105 and a second rollable portion 106, and the first rollable portion 105 and the second rollable portion 106 may be respectively disposed on the opposite sides of the rollable display panel 110. The first rollable portion 105 and the second rollable portion 106 may respectively have a rolling radius R in a rolled state. Disposed between the first rollable portion 105 and the second rollable portion 106, there may be a display portion 107 of the rollable display panel 110. At least one of the first rollable portion 105 and the second rollable portion 106 may include one or more electronic components or computing units, for example include a bonding pad (not shown), a battery (not shown), a system board (not shown), a printed circuit board (PCB), a chip on film (COF), a flexible printed circuit assembly (FPCA) (not shown) or a combination of the above, but the present disclosure is not limited thereto. At least one of the first rollable portion 105 and the second rollable portion 106 may include an electronic system (not shown) of the display device 100, and a heat dissipation sheet 140 may be provided between the electronic system (not shown) and the rollable display panel 110, but the present disclosure is not limited thereto. In this variant embodiment, the electronic system 130 may also be provided in the display portion 107 to be physically and/or electrically connected to the heat dissipation sheet 140 in the display portion 107. Therefore, the electronic system 130 is still exposed when the rollable display panel 110 is rolled to facilitate to improve the heat dissipation of the rollable display device 100. That is to say, the electronic system 130 physically and/or electrically connected to the heat dissipation sheet 140 in the display portion may quickly dissipate heat to everywhere through the heat dissipation sheet 140 whether the rollable display panel 110 is rolled or unrolled, for example, to quickly dissipate heat to the rollable display panel 110 in the display portion 107 and/or to quickly dissipate heat to at least one of the first rollable portion 105 and the second rollable portion 106 to facilitate the display device 100 to have a better heat dissipation characteristic, but the present disclosure is not limited thereto.

Figure 21:
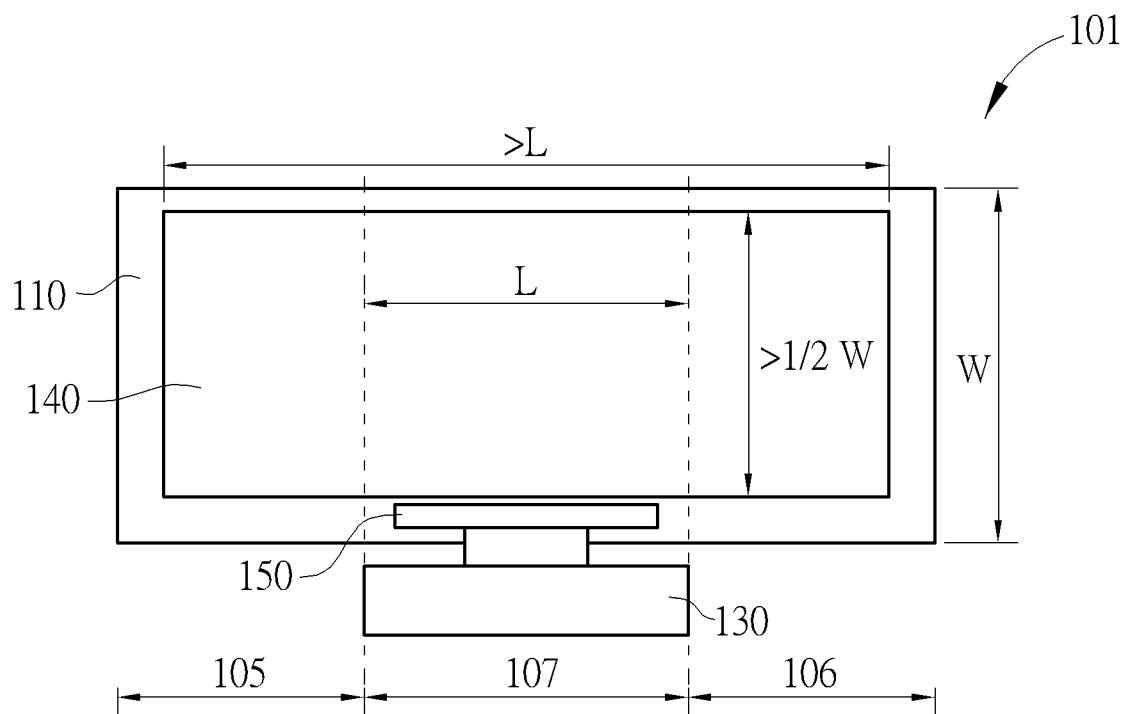
FIG. 21 is a schematic top view of the display device corresponding to FIG. 20 when it is unrolled.

FIG. 21 is a schematic top view of the display device 101 corresponding to FIG. 20 when it is unrolled. The width of the heat dissipation sheet 140 may be greater than 0.5 W if the width of the rollable display panel 110 is W, but the present disclosure is not limited thereto. The length of the heat dissipation sheet 140 may be greater than L if the length of the rollable display panel 110 in the display portion is L, so that the heat dissipation sheet 140 may extend into at least one of the first rollable portion 105 and the second rollable portion 106 to facilitate to increase the heat dissipation ability of the heat dissipation sheet 140.

Figure 22:
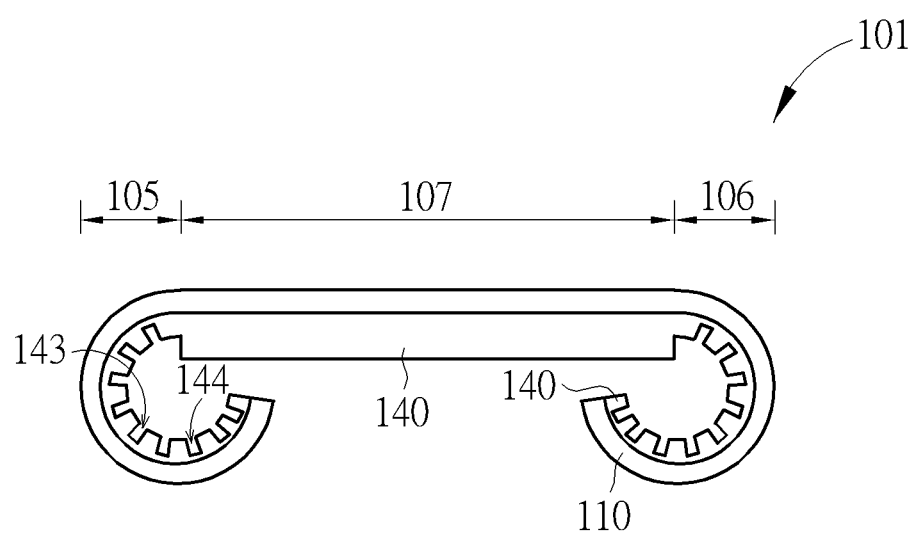
FIG. 22 is a schematic side view of the display device corresponding to FIG. 21 when it is rolled.

FIG. 22 is a schematic side view of the display device 101 corresponding to FIG. 21 when it is rolled. The heat dissipation sheet 140 in at least one of the first rollable portion 105 and the second rollable portion 106 may include at least one of the recess 143 and the trench 144, and the quantity of the recess 143 and the trench 144 may be optional as needed. Please refer to the aforementioned descriptions for the details and advantages of the recess 143 and the trench 144. FIG. 22 illustrates that the first rollable portion 105 and the second rollable portion 106 may include recesses 143 and the trenches 144, but the present disclosure is not limited thereto.

Figure 23:
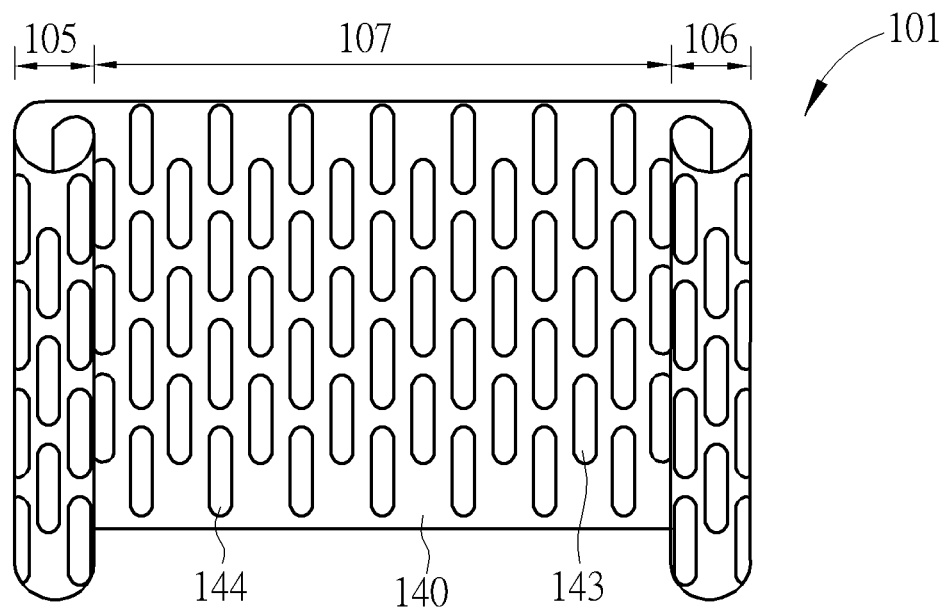
FIG. 23 is a schematic bottom view corresponding to the implementations of FIG. 20 or of FIG. 22.

FIG. 23 is a schematic bottom view corresponding to the implementations of FIG. 20 or of FIG. 22. The heat dissipation sheet 140 may include a recess 143 and a trench 144, and the recess 143 and the trench 144 may be disposed in at least one of the first rollable portion 105, the second rollable portion 106 and the display portion 107. FIG. 23 shows that the recesses 143 and the trenches 144 may be provided in the first rollable portion 105, in the second rollable portion 106 and in the display portion 107, but the present disclosure is not limited thereto.

Figure 24:
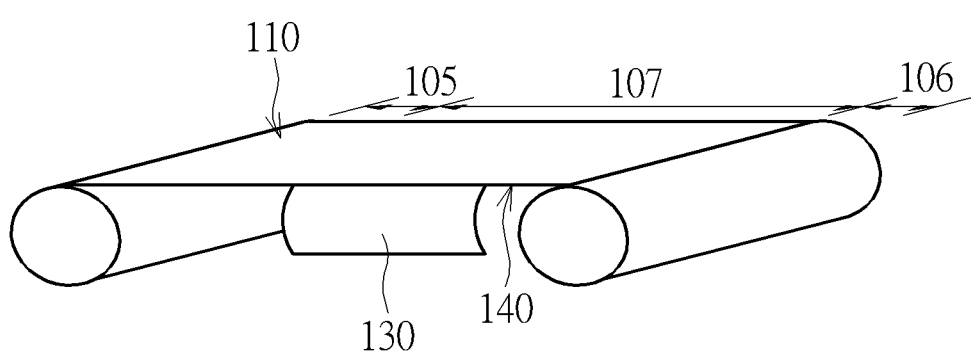
FIG. 24 is a schematic diagram corresponding to the implementations of FIG. 20 or of FIG. 22.

FIG. 24 is a schematic diagram corresponding to the implementations of FIG. 20 or of FIG. 22. The electronic system 130 may be provided under the rollable display panel 110, and the electronic system 130 may also be provided between the first rollable portion 105 and the second rollable portion 106, but the electronic system 130 is exposed to facilitate to increase the heat dissipation ability of the display device 101.

Figure 25:
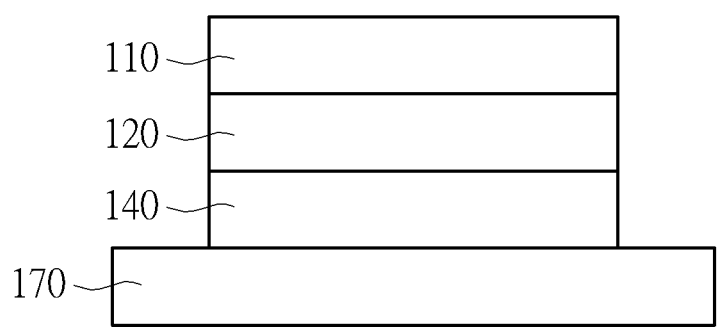
FIG. 25 is a schematic partial cross-sectional side view of the display device according to the sixth embodiment of the present disclosure.

FIG. 25 is a schematic partial cross-sectional side view of the display device 100 according to the sixth embodiment of the present disclosure. The display device 100 of the sixth embodiment of the present disclosure may include a heat dissipation frame 170 to facilitate the heat dissipation along the planar direction and homogenizes hot spots. For example, the heat dissipation frame 170 may be disposed under the heat dissipation sheet 140, so that the heat dissipation sheet 140 may be disposed between the heat dissipation frame 170 and the rollable display panel 110 or the optional supporting plate 120. For example, the heat dissipation frame 170 may be disposed in the first region 113 or disposed adjacent to the axis 109, but the present disclosure is not limited thereto. For example, according to some embodiments, the heat dissipation frame 170 may not be rolled out together with the heat dissipation sheet 140 and not with the rollable display panel 110 when the heat dissipation sheet 140 is rolled out together with the rollable display panel 110. For example, taking FIG. 16 as an example, the heat dissipation frame (not shown) may not be rolled out together with the heat dissipation sheet 140 and not with the rollable display panel 110 to be accommodated in the housing 160, but the present disclosure is not limited thereto. The heat dissipation frame 170 may include a strong material, such as glass or plastic, or a material with a high thermal conductivity, such as a metal or an alloy, for example an aluminum-magnesium alloy, but the present disclosure is not limited thereto.

According to the rollable display device of the embodiments of the present disclosure, the installation of the heat dissipation sheet facilitates the thermal conduction and/or dissipation of the heat generated by the rollable display panel, thereby improving the heat dissipation quality of the rollable display device to enhance the reliability of the rollable display device.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A display device, comprising:
  a flexible display panel having two surfaces opposite to each other; and
  a heat dissipation sheet disposed on one of the two surfaces of the flexible display panel and being foldable together with the flexible display panel; and
  a heat dissipation layer, wherein the heat dissipation sheet is disposed between the heat dissipation layer and the flexible display panel;
  wherein in a side view, the heat dissipation sheet comprises at least one opening.

2. The display device according to claim 1, wherein the at least one opening penetrates the heat dissipation sheet.

3. The display device according to claim 1, further comprising an electronic system, wherein at least a portion of the electronic system is disposed on one of the two surfaces of the flexible display panel.

4. The display device according to claim 3, wherein the electronic system comprises a flexible printed circuit board.

5. The display device according to claim 1, wherein a material of the heat dissipation sheet comprises diamond, silver, copper, gold, aluminum, graphite, or a combination thereof.

6. The display device according to claim 1, wherein the heat dissipation sheet has a thermal conductivity greater than 200 W/mK.

7. The display device according to claim 1, wherein the flexible display panel comprises a peripheral area and an active area, and the peripheral area surrounds the active area.

8. The display device according to claim 1, further comprising a housing to accommodate the flexible display panel and the heat dissipation sheet.

* * * * *